(12) United States Patent
Hayashi (10) Patent No.: US 6,322,958 B1
(45) Date of Patent: Nov. 27, 2001

(54) LASER MARKING METHOD AND APPARATUS, AND MARKED MEMBER

(75) Inventor: Kenichi Hayashi, Kanagawa (JP)

(73) Assignee: Sumitomo Heavy Industries Ltd., Tokyo (JP)

( * ) Notice: Subject to any disclaimer, the term of this patent is extended or adjusted under 35 U.S.C. 154(b) by 0 days.

(21) Appl. No.: 09/581,536

(22) PCT Filed: Nov. 26, 1999

(86) PCT No.: PCT/JP99/06605

§ 371 Date: Jul. 10, 2000

§ 102(e) Date: Jul. 10, 2000

(87) PCT Pub. No.: WO00/30798

PCT Pub. Date: Jun. 2, 2000

(30) Foreign Application Priority Data

Nov. 26, 1998 (JP) .................................... 10-336217

(51) Int. Cl.[7] .......................... B23K 26/00; B23K 26/06; B41M 5/24
(52) U.S. Cl. .............. 430/495; 219/121.85; 219/121.68; 430/DIG. 964; 264/482; 428/98; 428/203; 65/111; 65/DIG. 3
(58) Field of Search .......................... 219/121.85, 121.6, 219/121.68, 121.69, 121.78; 430/495, DIG. 964; 264/482; 428/410, 426, 98, 195, 203; 65/111, DIG. 3

(56) References Cited

U.S. PATENT DOCUMENTS

| | | | |
|---|---|---|---|
| 4,092,518 | * 5/1978 | Merard | 219/121.85 |
| 4,128,690 | * 12/1978 | Boardman et al. | 428/332 |
| 4,248,925 | * 2/1981 | Ambrogi | 428/212 |
| 4,338,114 | * 7/1982 | Brockway et al. | 65/28 |
| 4,675,500 | * 6/1987 | Kunz et al. | 219/121.73 |
| 5,260,139 | * 11/1993 | Shiraishi et al. | 428/488.1 |
| 5,501,944 | * 3/1996 | Hill et al. | 430/321 |
| 5,637,244 | * 6/1997 | Erokhin | 219/121.69 |
| 5,744,780 | * 4/1998 | Chang et al. | 219/121.73 |
| 5,767,483 | * 6/1998 | Cameron et al. | 219/121.85 |
| 5,776,220 | * 7/1998 | Allaire et al. | 65/112 |
| 5,786,560 | * 7/1998 | Tatah et al. | 219/121.77 |
| 5,886,318 | * 3/1999 | Vasiliev et al. | 219/121.69 |
| 5,935,464 | * 8/1999 | Dulaney et al. | 219/121.65 |
| 6,055,829 | * 5/2000 | Witzmann et al. | 65/105 |
| 6,087,617 | * 7/2000 | Troitski et al. | 219/121.6 |
| 6,130,400 | * 10/2000 | Rockstroh | 219/121.6 |

FOREIGN PATENT DOCUMENTS

| | | |
|---|---|---|
| 2-32317 | 2/1990 | (JP) . |
| 4-110944 | 4/1992 | (JP) . |
| 7-076167 | 3/1995 | (JP) . |
| 7-124763 | 5/1995 | (JP) . |

* cited by examiner

*Primary Examiner*—Samuel M. Heinrich
(74) *Attorney, Agent, or Firm*—Arent, Fox, Kintner, Plotkin & Kahn, PLLC (57) ABSTRACT

A laser beam is radiated from a laser source. The laser beam radiated from the laser source is converged at a converging point inside of a work member to form cracks at the converging point and in its nearby area, by making a cross section of the laser beam at the converging point have a shape long in a first direction perpendicular to an optical axis of the laser beam. Markers easy to increase contrast can be formed in the work member.

10 Claims, 7 Drawing Sheets

LASER MARKING METHOD AND APPARATUS, AND MARKED MEMBER

TECHNICAL FIELD

The present invention relates to a marking method using a laser beam and a laser marking apparatus, and more particularly to a laser marking method and apparatus for forming a marker in a transparent member to be worked.

BACKGROUND ART

A method is known by which the surface of a work member such as a transparent glass substrate is marked by utilizing ablation by a laser beam. With this method, fine cracks are formed on the surface of a work member and broken pieces are sometimes mixed with another work member on a manufacture line. Since deposits called debris are formed near the marked area, it becomes necessary to clean and remove such deposits.

A method is disclosed in JP-A-HEI-3-124486 by which a marker is formed in a work member by converging a laser beam at the inside thereof, without damaging the surface of the work member. With this method, since the surface of a work member is not damaged, it is possible to prevent formation of fine cracks and attachment of debris.

According to the method disclosed in JP-HEI-A-3-124486, when the energy density of a laser beam exceeds a breakdown threshold value of a work member, at the converging point of the laser beam or in its nearby area, fine parts of the work member are destructed and a marker is formed. By disposing fine markers in two- or three-dimensionally, characters or figures can be drawn. By narrowing a pitch between disposed fine markers, the contrast of characters or figures can be improved.

With this method, however, it is difficult to control the shape of a fine marker formed through destruction of a work member. The shapes of markers become, therefore, irregular. If adjacent markers contact each other, the mechanical strength of the work member lowers. It is therefore preferable to dispose markers in a dispersed manner. In order not to make adjacent markers contact each other even if the shapes of markers are irregular, it is necessary to increase the pitch between adjacent markers and provide a margin to some extent.

DISCLOSURE OF THE INVENTION

It is an object of the present invention to provide a marking method and apparatus capable of improving controllability of marker shapes to be formed by a laser beam.

It is another object of the present invention to provide a transparent member with markers formed therein and having high contrast.

According to one aspect of the present invention, there is provided a marking method comprising the steps of: radiating a laser beam from a laser source; and converging the laser beam radiated from the laser source at a converging point inside of a work member to form cracks at the converging point and in its nearby area, by making a cross section of the laser beam at the converging point have a shape long in a first direction perpendicular to an optical axis of the laser beam.

The optical characteristics of the work member change at the converging point of the laser beam and in its nearby area. The portion whose optical characteristics changed has a linear shape along the optical axis of the laser beam. Areal (Plane-like) cracks extend from the linear part in the first direction. The linear part with changed optical characteristics and areal cracks can be visually recognized.

According to another aspect of the present invention, there is provided a marking apparatus comprising: a laser source for radiating a laser beam; beam shaping means for shaping a shape of a cross section of the laser beam radiated from the laser source so as to make the cross section have a shape long in a first direction perpendicular to an optical axis of the laser beam; optical converging means for converging the laser beam shaped by the beam shaping means; and holding means for holding a work member so as to set a converging point of the laser beam converged by the optical converging means to a position inside of the work member.

As the laser beam having a shape long in the first direction is converged, the cross section of the laser beam at the converging point is made to have the shape long in a direction perpendicular to the first direction. Therefore, a marker having the linear part and areal cracks can be formed.

According to another aspect of the present invention, there is provided a marked member comprising: a transparent member; and markers formed in the transparent member, each of the markers including a linear portion having optical characteristics different from a nearby region and a pair of areal cracks extending from the linear portion in opposite directions.

The linear part and areal cracks can be visually recognized. They can be visually recognized easily particularly along a direction crossing a virtual plane along the areal cracks.

DETAILED DESCRIPTION OF THE PREFERRED EMBODIMENTS

Prior to describing embodiments of the invention, the shape of a marker formed by converging a laser beam at the inside of a work member will be described.

Figure 7:
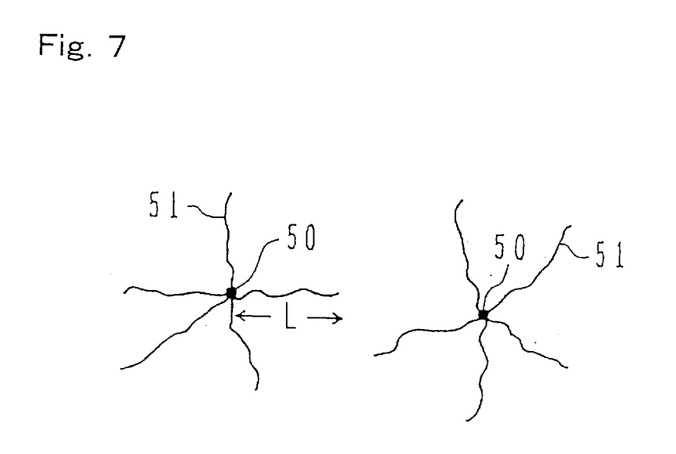
FIG. 7 is a plan view of markers formed by a conventional method.

FIG. 7 is a plan view of markers. The shapes of markers shown in FIG. 7 were obtained by radiating a laser beam along a direction perpendicular to the drawing sheet. At a converging point of a laser beam and in its nearby area, a linear crack 50 is formed whose optical characteristics are changed along the optical axis of the laser beam. A plurality of areal cracks 51 radially extends from the linear crack 50. The extension directions of areal cracks 51 and the number thereof are indefinite. In order not to make any areal crack 51 contacts another areal crack 51 of an adjacent marker, it is necessary to set the distance between adjacent liner cracks 50 larger than 2L, where L is the maximum extension length of the areal crack 51.

Figure 1:
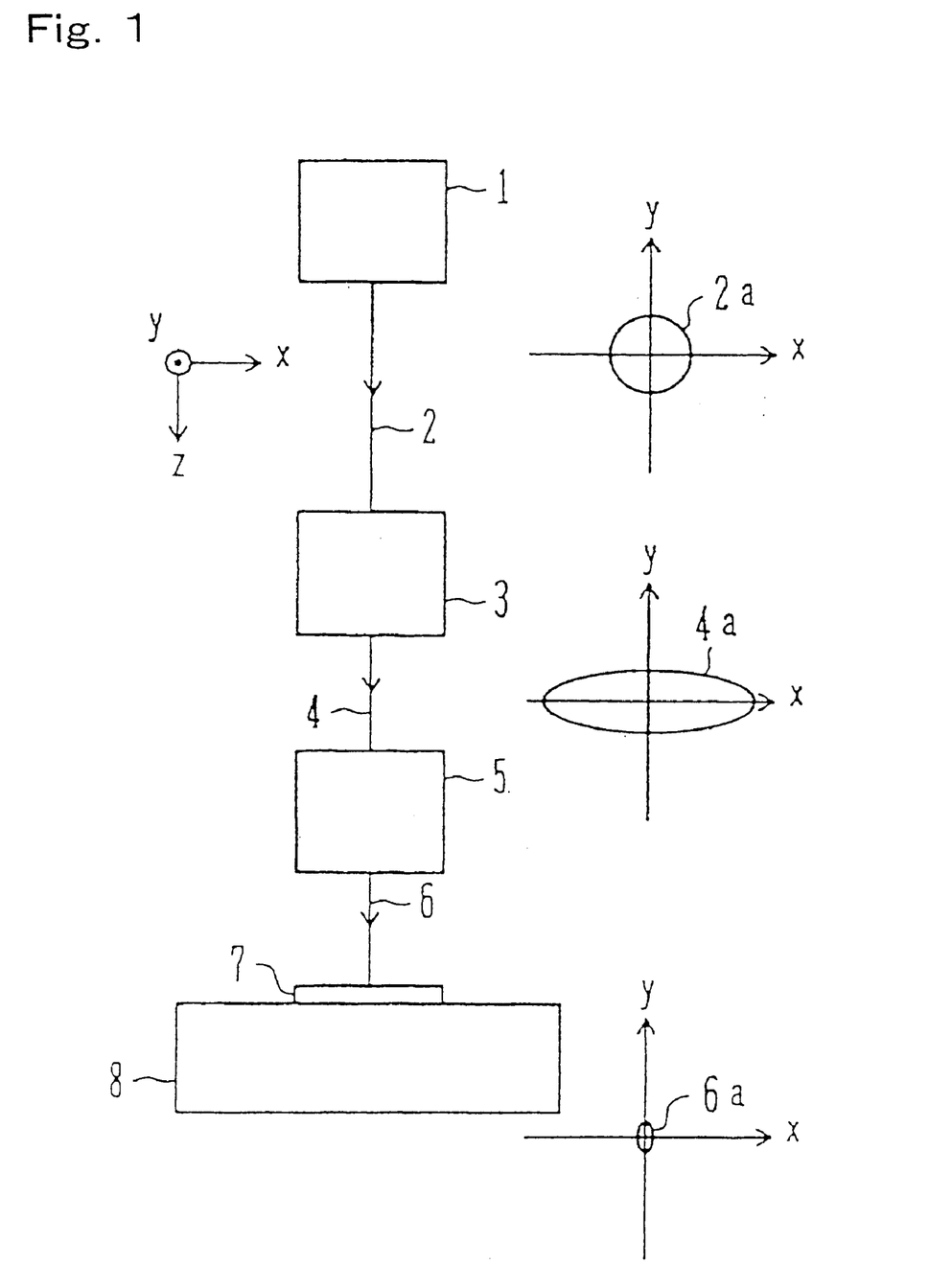
FIG. 1 is a schematic diagram of a marking apparatus used by a marking method according to a first embodiment.

FIG. 1 is a schematic diagram of a marking apparatus used by a marking method according to the first embodiment. A laser beam source 1 radiates a pulsed laser beam 2. As the laser beam source 1, solid state laser may be used such as Nd:YAG laser and Nd:YLF laser. A laser beam 2 may be a fundamental wave laser beam or a higher harmonic wave laser beam. Consider now an xyz orthogonal coordinate system having as the z-axis the optical axis of the laser beam 2. The shape of a cross section 2a of the laser beam 2 is approximately circular.

A beam shaper 3 shapes the beam shape of the laser beam 2. Specific examples of the structure of the beam shaper 3 will be later described with reference to FIGS. 5A to 5C. The cross section 4a of a shaped laser beam 4 has a shape long in an x-axis direction. An optical convergence system 5 converges the laser beam 4. The optical convergence system 5 is, for example, a convex lens.

A transparent member 7 to be worked is placed on a holding stage 8. A laser beam 6 converged by the optical convergence system 5 becomes incident upon the work member 7. The holding stage 8 holds the work member 7 such that the converging point of the laser beam 6 is positioned at the inside of the work member 7. The holding stage 8 can move the work member 7 in the x-y plane.

The cross section of the laser beam 6 output from the optical convergence system 5 has a shape long in the x-axis direction. Therefore, an effective numerical aperture (NA) of the optical convergence system 5 in the z-x plane is larger than that in the y-z plane. The laser beam 6 is converged on a smaller area in the larger NA plane. Therefore, the cross section 6a of the laser beam 6 at the converging point has a shape long in the y-axis direction.

When the energy density of the laser beam 6 at the converging point exceeds a threshold value of an optical damage or optical breakdown of the work member 7, a fine marker is formed in the work member 7 at the converging point and in its nearby area. Each time the pulsed laser beam 6 is radiated, the work member 7 is moved in the x-y plane. In this manner, markers disposed two-dimensionally can be formed in the work member 7.

Figure 2A:
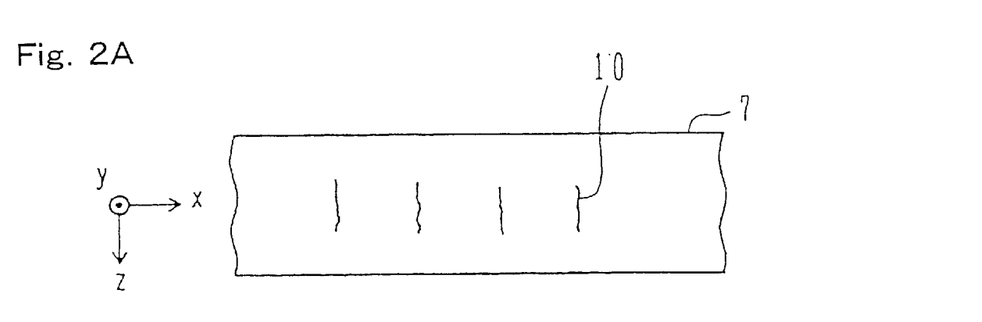
FIGS. 2A and 2B are a side view and a plan view of markers formed by the marking method of the first embodiment.
Figure 2B:
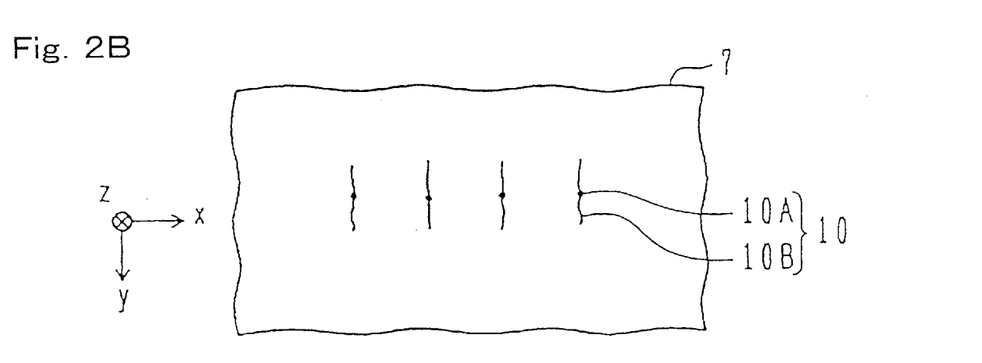

FIGS. 2A and 2B are a front view of markers as viewed along the y-axis and a plan view thereof as viewed along the z-axis. Each marker 10 is constituted of a column portion 10A and a areal portion 10B. The column portion 10A extends along the z-axis. The areal portion 10B is a planar crack in parallel to the y-z plane and extends from the column portion 10A in positive and negative y-axis directions. The reason why the areal portion 10B extends along the y-axis may be ascribed to that the cross section 6a of the laser beam 6 at the converging point has a shape long in the y-axis direction as described with reference to FIG. 1.

The areal portion 10b in parallel to the y-z plane is not easy to visualize along a direction in parallel to the y-z plane, but it is easy to visualize along a direction oblique to the y-z plane, particularly along a direction slanted from the z-axis toward the x-axis. By distributively disposing markers 10 in the X-y plane, visual representations such as characters and figures can be drawn.

The shape of the marker 10 can be adjusted by controlling the shape of the cross section of the laser beam 6 at the converging point. The areal portion 10B does not extend in the x-axis direction. Therefore, the markers 10 can be disposed at a narrow pitch along the x-axis. Since the markers 10 can be disposed at a narrow pitch, the contrast of each visual representation realized by the marker 10 can be increased.

Figure 3:
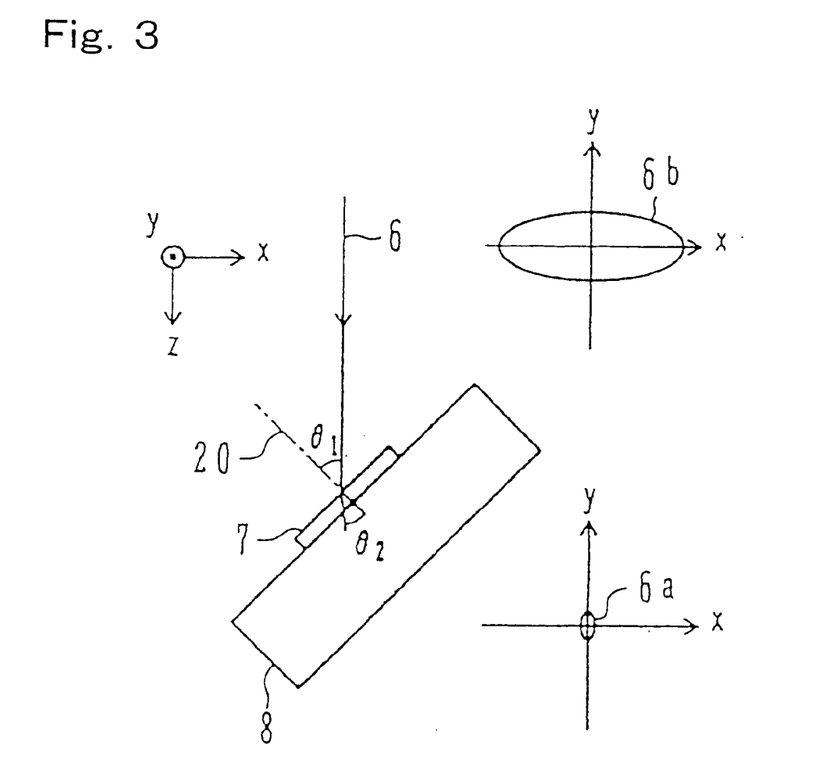
FIG. 3 is a schematic diagram of a marking apparatus used by a marking method according to a second embodiment.

FIG. 3 is a schematic diagram showing the positional relation between a work member 7 and a laser beam 6, illustrating a marking method according to the second embodiment. In the first embodiment shown in FIG. 1, the laser beam 6 is applied vertically to the work member 7. In the second embodiment, a laser beam is applied obliquely to a work member 7.

As shown in FIG. 3, the normal 20 to the surface of the work member 7 is slanted in the z-x plane toward the negative x-axis. The incidence plane of the laser beam 6 is in parallel to the z-x plane. Similar to the first embodiment, the cross section 6b of the laser beam 6 immediately after it is converged by the optical convergence system 5 has an ellipsoid shape long in the x-axis direction. The cross section 6a at the converging point has a shape long in the y-axis direction.

The following relation is satisfied:

$$n_1 \sin \theta_1 = n_2 \sin \theta_2$$

where $\theta_1$ is an incidence angle and $\theta_2$ is a refractive angle relative to the work member 7, and $n_1$ is a refractive index of air and $n_2$ is a refractive index of the work member 7.

Figure 4A:
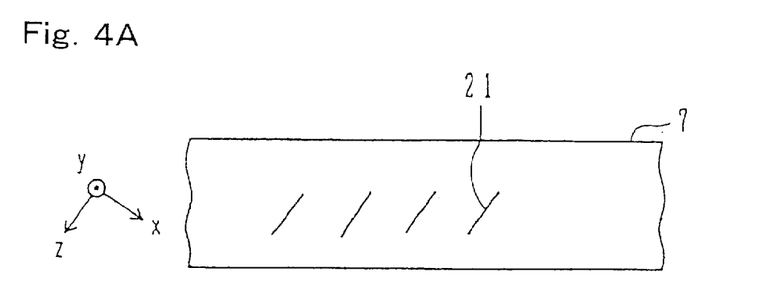
FIGS. 4A and 4B are a side view and a plan view of markers formed by the marking method of the second embodiment.
Figure 4B:
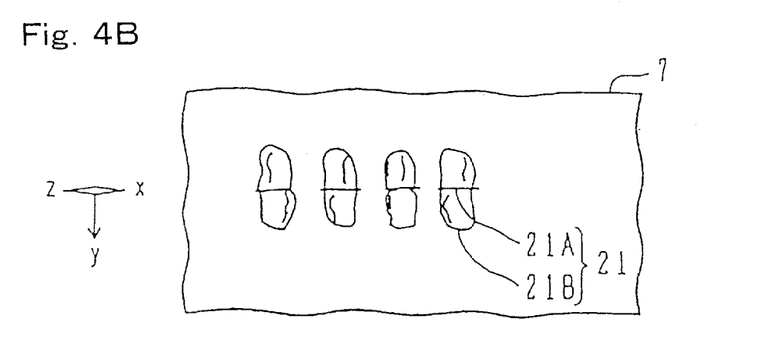

FIG. 4A is a front view of markers as viewed along the y-axis direction, and FIG. 4B is a plan view of the markers as viewed along the normal direction of the work member 7. Similar to the first embodiment, each marker 21 is constituted of a linear portion 21A and an areal portion 21B.

The linear portion 21A extends along the z-axis. Namely, the linear portion 21A is disposed obliquely relative to the surface of the work member 7. Therefore, the linear portion 21A is not likely to reach the surface of the work member 7 and can be formed in the work member with good reproductivity.

The areal portion 21B extends from the linear portion 21A in the y-axis direction. Namely, the areal portion 21B extends along a second virtual plane that crosses at a right angle a first virtual plane defined by the linear portion 21A and the normal to the surface of the work member 7 and includes the linear portion 21A. All the areal portions 21B are disposed generally in parallel. Since the areal portion 21B does not extend toward the surface of the work member 7, cracks do not reach the surface of the work member 7. Since the areal portion 21B does not extend toward the x-axis direction, the markers 21 can be disposed at a relatively narrow pitch along a direction of a vertically projected image of the x-axis upon the surface of the work member 7.

In the second embodiment, since the areal portion 21B is slanted relative to the surface of the work member 7, visual recognition of the markers can be improved as viewed along the normal line direction. In order to obtain sufficient effects of improving visual recognition, it is preferable that the incidence angle of the laser beam 6 relative to the surface of the work member 7 is set to 5° or larger, or more preferably 10° or larger. As the incidence angle is made large, a loss by surface reflection becomes large. Therefore, it is preferable that the incidence angle is set not larger than 80°. If the work member 7 is to be worked in liquid having a refraction factor near that of water or the work member 7, the incidence angle may be set 80° or larger.

Figure 5A:
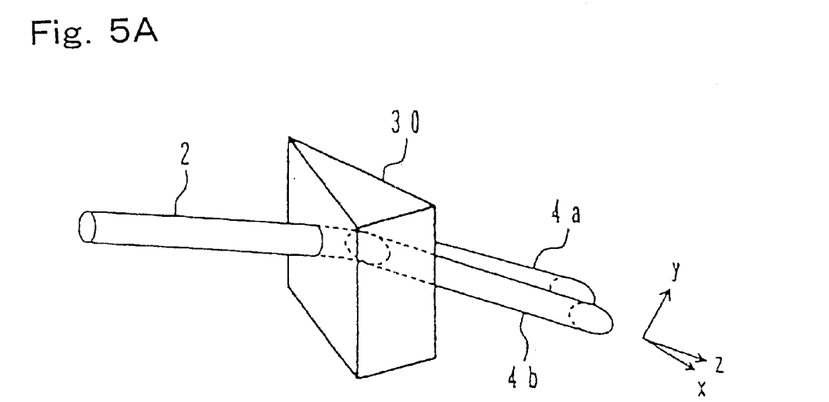
FIGS. 5A to 5C are perspective views showing examples of the first to third structures of a beam shaper.

FIG. 5A shows a first example of the structure of the beam shaper 3 shown in FIG. 1. The beam shaper 3 has a prism 30.

A laser beam 2 having a circular beam cross section is vertically incident upon the prism 30. The laser beam 2 is refracted at the output planes of the prism 30 and laser beams 4a and 4b output from the prism 30 have an ellipsoidal cross section. For example, the laser beam 4a is a fundamental wave, and the laser beam 4b is the second harmonic wave.

One of the laser beams 4a and 4b is made incident upon the optical convergence system 5 shown in FIG. 1. Since one of the fundamental wave and second harmonic wave is used, wavelength dispersion of the optical convergent system 5 is not necessary to be taken into consideration. Therefore, design of the optical convergence system 5 and position alignment between the work member 7 and converging point become easy.

Figure 5B:
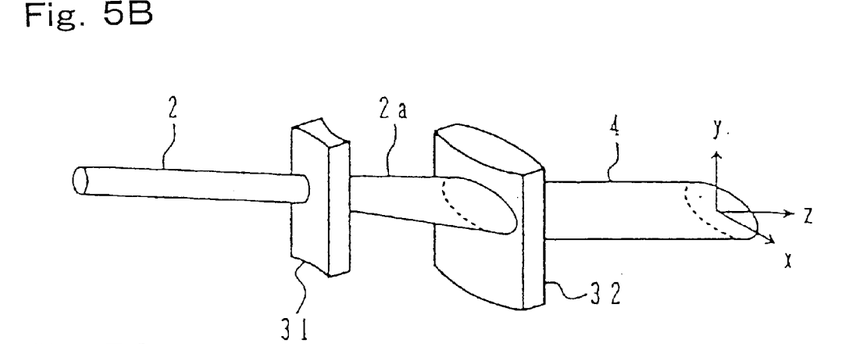

FIG. 5B shows a second example of the structure of the beam shaper 3. The beam shaper 3 is constituted of a concave cylindrical lens 31 and a convex cylindrical lens 32. The optical axes of the concave and convex cylindrical lenses 31 and 32 are coincident with the z-axis, the generating lines of both the cylindrical surfaces being disposed in parallel to the y-axis. A laser beam 2 having a circular beam cross section is incident upon the concave cylindrical lens 31. The concave cylindrical lens 31 forms a laser beam 2a dispersing in the z-x plane. This laser beam 2a is incident upon the convex cylindrical lens 32 and converged in the z-x plane. A laser beam 4 transmitted through the convex cylindrical lens 32 becomes parallel light wave fluxes having a beam cross section long in the x-axis direction.

Figure 5C:
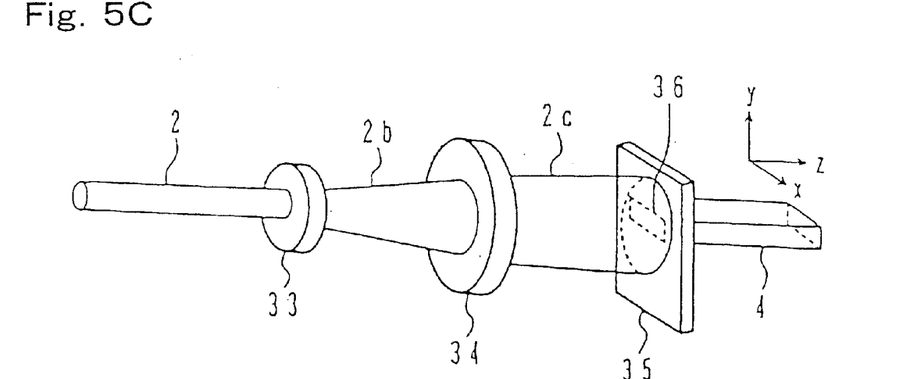

FIG. 5C shows a third example of the structure of the beam shaper 3. The beam shaper 3 is constituted of a concave lens 33, a convex lens 34 and a partial light shielding plate 35. The optical axes of the concave and convex lenses 33 and 34 are disposed in coincidence with the z-axis, and the partial light shielding plate 35 is disposed crossing the z-axis at a right angle. The partial light shielding plate 35 is formed with a window 36 long in the x-axis direction.

A laser beam 2 having a circular beam cross section is incident upon the concave lens 33 and a diverging laser beam 2b is formed. This diverging laser beam 2b is incident upon the convex lens 34 and a laser beam 2c of parallel light beam profiles are formed. The laser beam 2c is shaped by the partial light shielding plate 35 to form a laser beam 4 having the beam cross section corresponding to the shape of the window 36.

The partial light shielding plate 35 may be disposed at the output side of the optical convergence system 5 shown in FIG. 1 to shape the beam cross section of the laser beam 6. Namely, as shown in FIG. 1, although after the laser beam 4 is shaped with the beam shaper 3, the laser beam is converged by the optical convergence system 5, a converged laser beam may be formed first by the optical convergence system 5 and thereafter its beam cross section is shaped by the beam shaper 3.

Other anamorphic optical systems may be used in addition to those three structures of the beam shaper shown in FIGS. 5A to 5C.

Next, experiment results of marking by the second embodiment method will be described. The laser beam used was the second harmonic wave (wavelength of 523.5 nm) of Nd:YLF. The laser beam energy per one shot was 0.5 mJ and the pulse width was about 15 ns. The beam shaper 3 used had the first structure shown in FIG. 5A. As the optical convergence system 5, a camera lens having a focal length of 28 mm was used. The incidence angle of the laser beam relative to the work member 7 was 45°.

Under the conditions described above, markers were formed in a glass substrate having a thickness of 1.1 mm. Markers 21 having slanted areal portions 21B such as shown in FIGS. 4A and 4B could be formed. Cracks did not reach the surface of the glass plate and were formed only inside of the glass plate. These markers could be easily visualized along a normal direction to the surface of the glass plate.

In the second embodiment shown in FIG. 3, in order to distribute markers two-dimensionally, the work member 7 is moved in a plane in parallel to the surface of the work member 7. Alternatively, the laser beam 6 may be scanned in the y-axis direction to distribute markers along the y-axis direction. Scanning the laser beam 6 can be performed by using, for example, a galvanomirror or a polygon mirror. In this case, the moving member 7 is moved only along a straight line perpendicular to the y-axis.

As shown in FIG. 3, as the laser beam 6 is made obliquely incident upon the work member 7, the laser beam 6 is refracted at the surface of the work member 7. In order to avoid or mitigate the influence of refraction, markers may be formed by immersing the work member 7 in water. Generally, water has a refractive index nearer to that of the work member 7 than air. Therefore, by using water, a change angle of the laser beam along the progressing direction to be caused by refraction can be made small. In stead of immersing the work member in water, it may be immersed in liquid having a refractive index nearer to that of the work member 7 than air.

Figure 6:
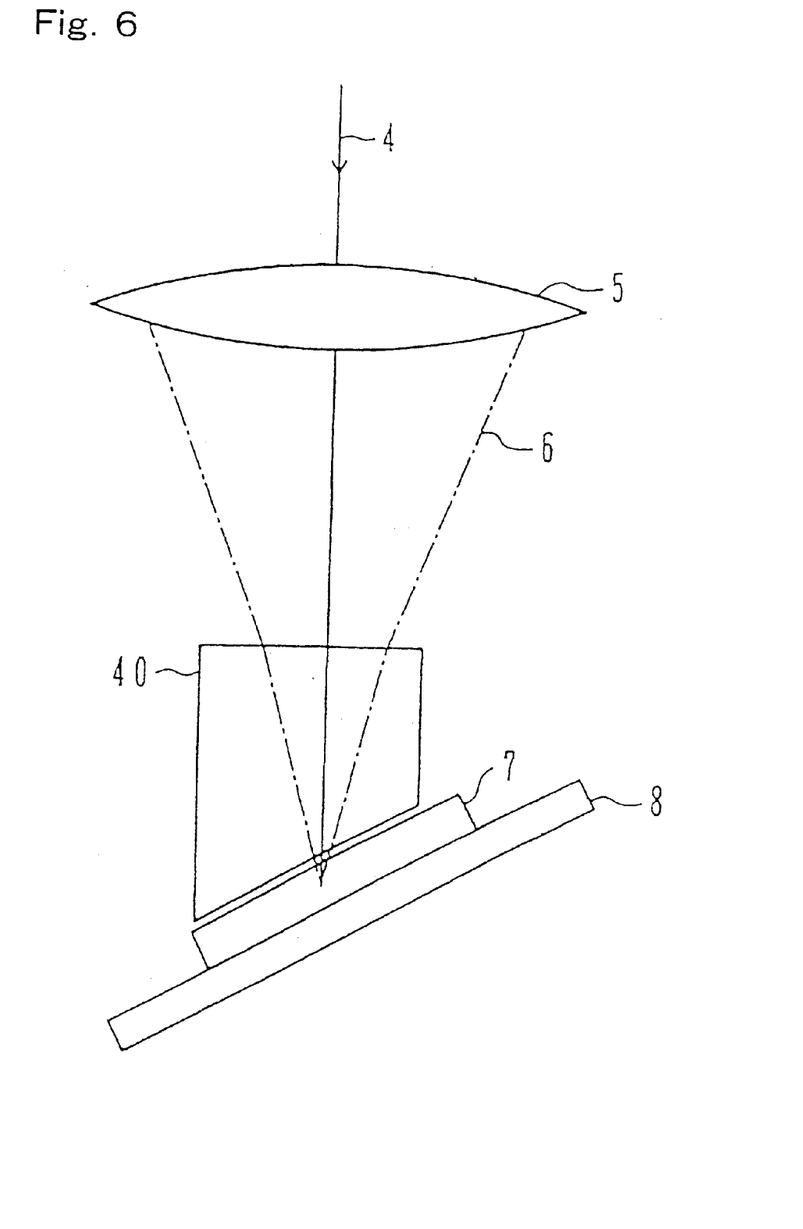
FIG. 6 is a schematic diagram of a marking apparatus used by a marking method according to a third embodiment.

FIG. 6 is a schematic cross sectional view of a marking apparatus to be used by the marking method of the third embodiment. A shaped laser beam 4 shown in FIG. 1 is incident upon the optical convergence system 5. The laser beam 6 converged by the optical convergence system 5 is made vertically incident upon a trapezoidal prism 40. The output plane of the trapezoidal prism 40 is disposed obliquely relative to the optical axis of the laser beam 6. A work member 7 is disposed spaced apart by a fine gap from the output plane of the trapezoidal prism 40. Refractive index adjusting liquid is filled in this gap.

If differences of refractive index of the trapezoidal prism 40, refractive index adjusting liquid and work member 7 are made small, the laser beam output from the trapezoidal prism 40 can be converged in the work member 7 without being greatly refracted.

In the first to third embodiments, although markers were formed in glass substrates, they may be formed in other transparent members. For example, markers can be formed in a PMMA substrate.

The present invention has been described in connection with the preferred embodiments. The invention is not limited only to the above embodiments. It is apparent that various modifications, improvements, combinations, and the like can be made by those skilled in the art.

What is claimed is:

1. A marking method comprising the steps of:

radiating a laser beam from a laser source; and converging the laser beam radiated from the laser source at a converging point inside of a work member to form cracks at the converging point and in its nearby area, by making a cross section of the laser beam at the converging point have a shape long in a first direction perpendicular to an optical axis of the laser beam.

2. A marking method according to claim 1, wherein said step of forming the cracks comprises the steps of:

shaping the laser beam radiated from the laser source to make a cross section of the laser beam have a shape long in a second direction perpendicular to a direction corresponding to the first direction in the cross section; and converging the shaped laser beam at the converging point.

3. A marking method according to claim 1, wherein the laser beam is obliquely incident upon the work member relative to a surface of the work member and the first direction is generally perpendicular to a plane of incidence of the laser beam.

4. A marking method according to claim 3, wherein an angle of incidence of the laser beam is 5° or larger.

5. A marking method according to claim 3, wherein in said step of forming the cracks, the laser beam is radiated to the work member immersed in liquid.

6. A marking apparatus comprising:

a laser source for radiating a laser beam;

a beam shaper for shaping a shape of a cross section of the laser beam radiated from said laser source so as to make the cross section have a shape long in a first direction perpendicular to an optical axis of the laser beam;

a converging lens for converging the laser beam shaped by said beam shaper; and a holder for holding a work member so as to set a converging point of the laser beam converged by said converging lens to a position inside of the work member.

7. A marking apparatus according to claim 6, wherein said holder holds the work member so as to make the laser beam be obliquely incident upon the work member relative to a surface of the work member.

8. A marking apparatus according to claim 7, wherein said holder holds the work member so as to make a direction corresponding to the first direction in the cross section be included in a plane of incidence of the laser beam.

9. A marked member comprising:

a transparent member; and markers formed in said transparent member, each of said markers including a linear portion having optical characteristics different from a nearby region and a pair of areal cracks extending from the linear portion in opposite directions.

10. A marked member according to claim 9, wherein said transparent member has a principal flat surface, said markers are formed at positions deeper than the principal surface, said linear portion is slanted relative to the principal surface, and each of said areal cracks is formed along a second virtual plane perpendicular to a first virtual plane including said linear portion and a normal to the principal surface, said second virtual plane including the linear portion.

\* \* \* \* \*